(12) United States Patent
Paulraj et al.

(10) Patent No.: US 11,899,602 B2
(45) Date of Patent: Feb. 13, 2024

(54) SMART NETWORK INTERFACE CONTROLLER OPERATING SYSTEM BINDING

(71) Applicant: Dell Products L.P., Round Rock, TX (US)

(72) Inventors: Deepaganesh Paulraj, Bangalore (IN); Akkiah Choudary Maddukuri, Austin, TX (US); Lee E. Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 17/730,076

(22) Filed: Apr. 26, 2022

(65) Prior Publication Data

US 2023/0342319 A1    Oct. 26, 2023

(51) Int. Cl.
*G06F 13/38* (2006.01)
*G06F 9/4401* (2018.01)

(52) U.S. Cl.
CPC .......... *G06F 13/385* (2013.01); *G06F 9/4406* (2013.01); *G06F 9/4416* (2013.01); *G06F 2213/3808* (2013.01)

(58) Field of Classification Search
CPC .... G06F 13/385; G06F 9/4406; G06F 9/4416; G06F 2213/3808
See application file for complete search history.

(56) References Cited

U.S. PATENT DOCUMENTS

| | | | |
|---|---|---|---|
| 11,159,599 B2* | 10/2021 | Greifeneder | H04L 67/62 |
| 2005/0022040 A1* | 1/2005 | Yamashita | G11B 20/00195 |
| | | | 713/300 |
| 2010/0118868 A1* | 5/2010 | Dabagh | H04L 49/90 |
| | | | 370/389 |
| 2016/0092687 A1* | 3/2016 | Boenisch | G06F 21/572 |
| | | | 713/2 |
| 2019/0079558 A1* | 3/2019 | Huang | G06F 13/4072 |
| 2019/0372804 A1* | 12/2019 | Li | G06F 13/385 |
| 2022/0206964 A1* | 6/2022 | Kim | G06F 13/107 |
| 2023/0177146 A1* | 6/2023 | Dastidar | G06F 21/85 |
| | | | 726/22 |

* cited by examiner

*Primary Examiner* — Faisal M Zaman
(74) *Attorney, Agent, or Firm* — Jackson Walker L.L.P.

(57) ABSTRACT

An information handling system may include a host system, a management controller configured to provide out-of-band management of the information handling system, and a network interface controller including a network interface controller storage resource. The management controller may be configured to: receive, from the host system, a first identifier that is specific to an operating system (OS) of the host system; compare the first identifier to a second identifier provided by the network interface controller, wherein the second identifier is specific to an OS of the network interface controller that is stored on the network interface controller storage resource; and in response to a mismatch between the first identifier and the second identifier, prevent the network interface controller from operating.

18 Claims, 4 Drawing Sheets

SMART NETWORK INTERFACE CONTROLLER OPERATING SYSTEM BINDING

TECHNICAL FIELD

The present disclosure relates in general to information handling systems, and more particularly to methods and systems for ensuring compatibility between an operating system of a smart network interface controller and an operating system of a host.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably. Further, it should be noted that some embodiments may operate on devices other than SmartNICs. For example, graphics processing units (GPUs), infrastructure processing units (IPUs), and other types of accelerators and smart devices may benefit from the ability to deploy an OS as described herein.

A SmartNIC may act as a system within a system, including its own Unified Extensible Firmware Interface Basic Input/Output System (UEFI BIOS) and its own operating system (OS) such as ESXio or any other suitable OS.

The host system that includes such a SmartNIC may execute a host OS, and the host OS and SmartNIC OS may have various dependencies upon one another. Accordingly, they may need to be compatible for proper functionality to be achieved. For example, the host OS and the SmartNIC OS may need to be provided by the same vendor. In some embodiments, they may also need to be of particular versions that are known to be compatible with one another.

Embodiments of this disclosure provide an identifier referred to herein as a "solution ID" that may be used to bind the SmartNIC OS and host OS together to ensure compatibility. For example, a system may verify that the solution ID of a SmartNIC matches the solution ID of the host system before allowing the SmartNIC to boot. This technique may be particularly relevant in situations where a SmartNIC is replaced, and the new SmartNIC needs to be validated as compatible with the host OS. Further, if a SmartNIC is moved from one system to a different system, the same compatibility check may be employed. This may ensure that the offload features provided by the SmartNIC are compatible with the host OS.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with binding a SmartNIC OS to a host OS may be reduced or eliminated.

In accordance with embodiments of the present disclosure, an information handling system may include a host system, a management controller configured to provide out-of-band management of the information handling system, and a network interface controller including a network interface controller storage resource. The management controller may be configured to: receive, from the host system, a first identifier that is specific to an operating system (OS) of the host system; compare the first identifier to a second identifier provided by the network interface controller, wherein the second identifier is specific to an OS of the network interface controller that is stored on the network interface controller storage resource; and in response to a mismatch between the first identifier and the second identifier, prevent the network interface controller from operating.

In accordance with these and other embodiments of the present disclosure, a method may include, in an information handling system including a host system, a management controller configured to provide out-of-band management of the information handling system, and a network interface controller that includes a network interface controller storage resource: the management controller receiving, from the host system, a first identifier that is specific to an operating system (OS) of the host system; the management controller comparing the first identifier to a second identifier provided by the network interface controller, wherein the second identifier is specific to an OS of the network interface controller that is stored on the network interface controller storage resource; and in response to a mismatch between the first identifier and the second identifier, the management controller preventing the network interface controller from operating.

In accordance with these and other embodiments of the present disclosure, an article of manufacture may include a non-transitory, computer-readable medium having instructions thereon that are executable by at least one processor of a management controller of an information handling system for: receiving, from a host system of the information handling system, a first identifier that is specific to an operating system (OS) of the host system; comparing the first identifier to a second identifier provided by a network interface controller, wherein the second identifier is specific to an OS of the network interface controller that is stored on a network interface controller storage resource; and in response to a mismatch between the first identifier and the second identifier, preventing the network interface controller from operating.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

Figure 1:
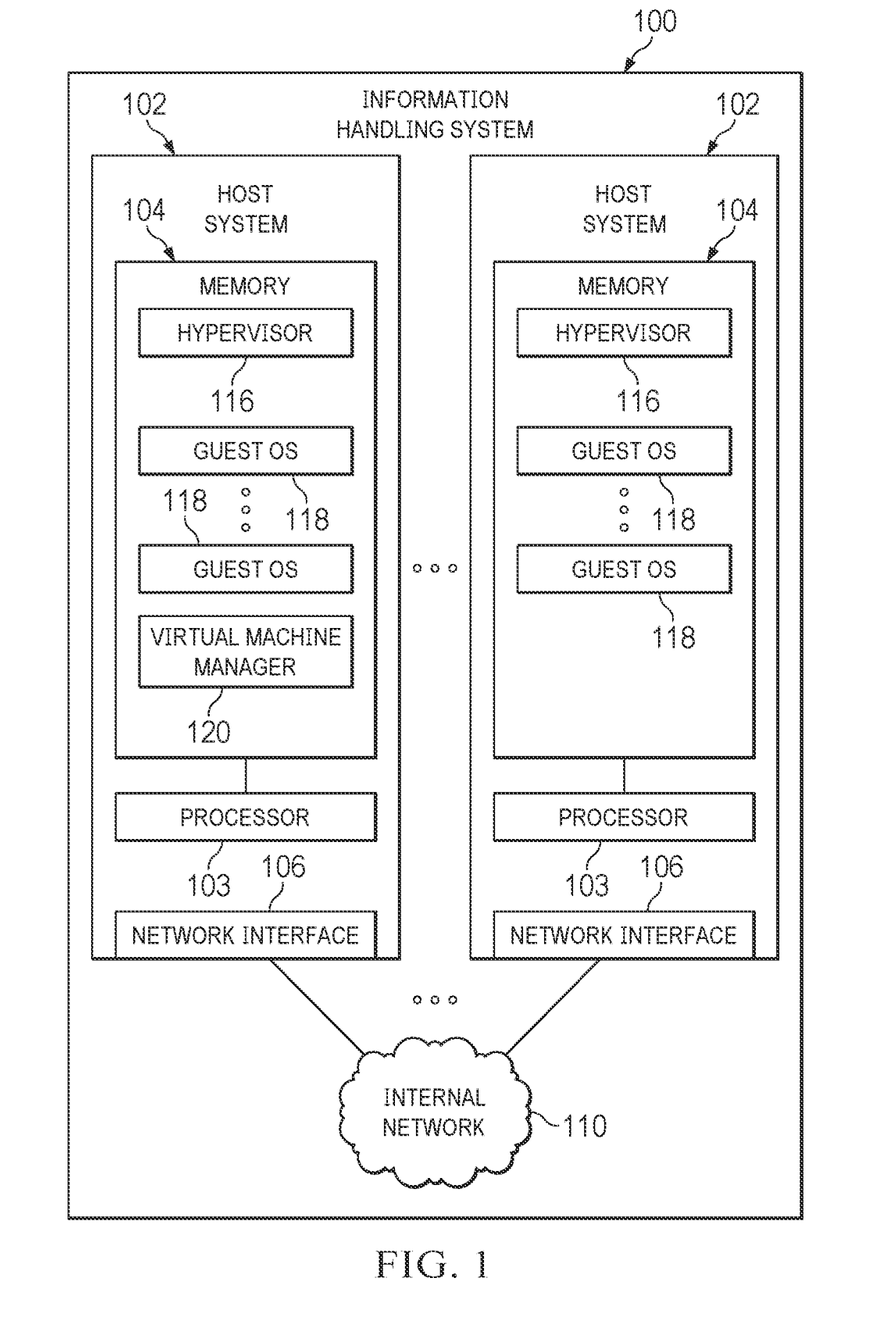
FIG. 1 illustrates a block diagram of selected components of an example information handling system, in accordance with embodiments of the present disclosure.

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for ensuring compatibility between a software executing on host system 102 (e.g., a host OS) and software executing on network interface 106 (e.g., a SmartNIC OS).

Figure 2:
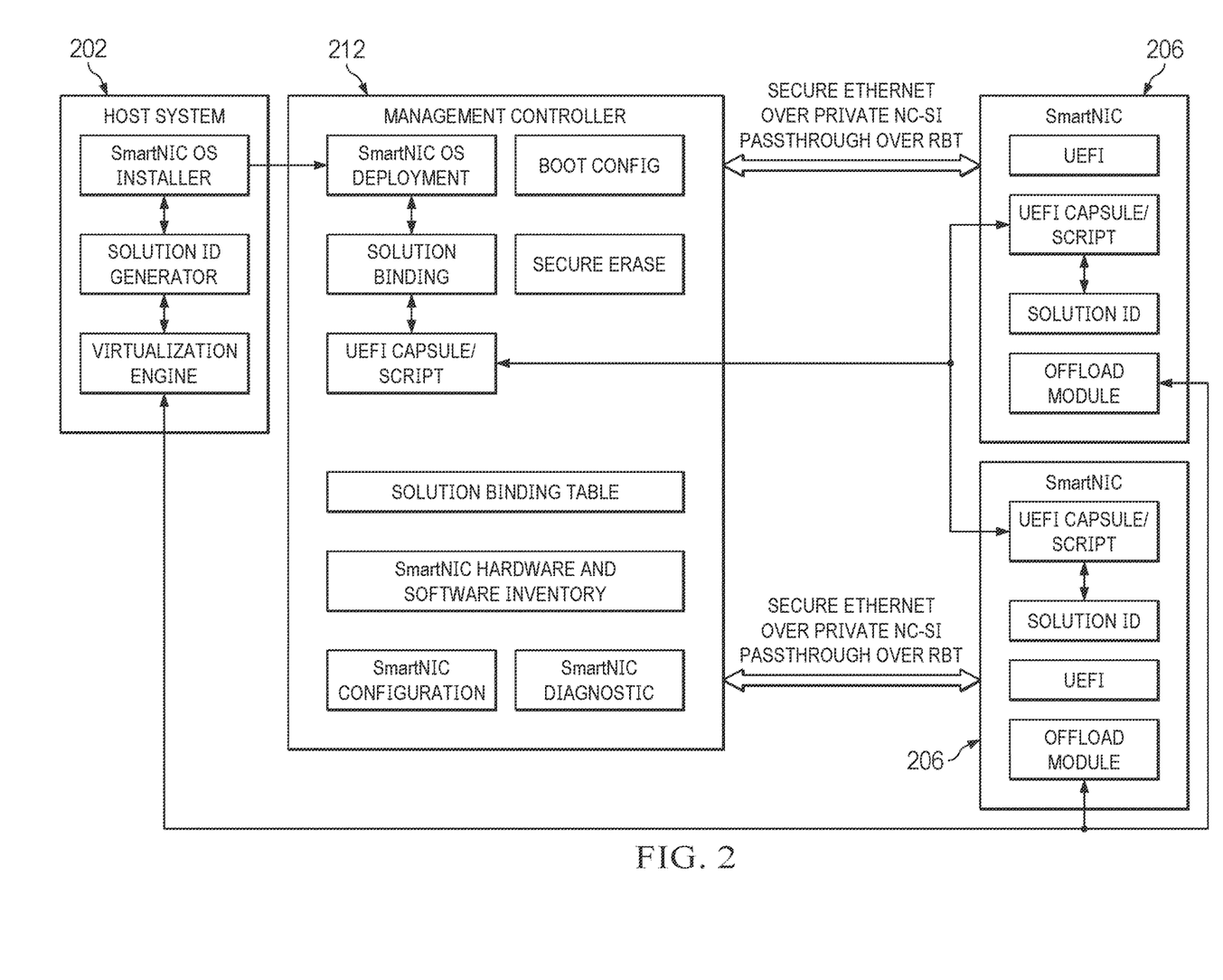
FIG. 2 illustrates a block diagram of selected components of an example information handling system, in accordance with embodiments of the present disclosure.

Turning now to FIG. 2, a block diagram of selected components of an information handling system 200 is shown, according to some embodiments. Information handling system 200 may include host system 202, management controller 212, and one or more SmartNICs 206. Host system 202 may be coupled to the hardware of SmartNICs 206 via a communication channel such as Peripheral Component Interconnect Express (PCIe) in some embodiments. Management controller 212 may be coupled to host system 202 via one or more communication channels, such as Ethernet over USB NIC, a system management bus (SMBus), etc. Management controller 212 may be coupled to SmartNICs 206 via a network controller sideband interface (NC-SI), which may be established over reduced media-independent interface (RMII) based transport (RBT), over PCIe vendor-defined message (VDM), over SMBus, etc.

As shown, host system 202 may include a virtualization engine, and SmartNICs 206 may include corresponding offload modules. As will be understood by one of ordinary skill in the art with the benefit of this disclosure, SmartNICs 206 may be used to offload various tasks (e.g., tasks relating to virtualized networking) from host system 202. This offloading may be implemented via the virtualization engine and the offload modules. For example, the virtualization engine may provide a control plane that pairs with a data plane provided by the offload module. However, in order for these components to be able to communicate with one another, they should be of compatible versions. Such version constraints may be enforced via the binding of solution IDs as described herein. One example of a virtualization engine is VMWare NSX.

To this end, management controller 212 may include a solution binding table, which may be a data structure that stores information relating host OS software with compatible SmartNIC OS software (or vice versa).

The host OS of host system 202 may generate a solution ID in any suitable manner. For example, the solution ID may be generated deterministically, randomly, or pseudo-randomly, and it may comprise a string, a number, a globally unique identifier (GUID), a universally unique identifier (UUID), etc. In one embodiment, the solution ID may be unique to the particular host system that generated it. In another embodiment, the solution ID may be common to all host systems that have the same host OS. Host system 202 may provide the solution ID to management controller 212 prior to or during the deployment of a SmartNIC OS to SmartNIC 206 by management controller 212.

When management controller 212 deploys a SmartNIC OS to SmartNIC 206, it may embed the solution ID into a UEFI capsule, which may be injected along with the SmartNIC OS image to the SmartNIC UEFI environment of SmartNIC 206. (For purposes of this disclosure, the UEFI capsule may also be referred to as a UEFI script.) The embedded solution ID may thus be an indicator of the host OS that is associated with that SmartNIC OS, binding the two together.

Once the SmartNIC OS has been successfully deployed, the injected UEFI capsule may store the solution ID within the SmartNIC UEFI environment, registering itself to automatically start upon every subsequent reboot of SmartNIC 206.

Management controller 212 may also register the solution ID with the host OS of host system 202, together with a UUID and/or fully qualified device descriptor (FQDD) identifying the SmartNIC 206. This information may be stored in non-volatile memory of host system 202 and/or of management controller 212.

Whenever SmartNIC 206 reboots, the embedded UEFI capsule may run, publishing the solution ID, the SmartNIC's UUID, and/or the SmartNIC's FQDD to management controller 212. Management controller 212 may then compare this information against the locally stored information in non-volatile memory. If the solution ID stored in the SmartNIC matches the solution ID stored in non-volatile memory, management controller 212 may allow the SmartNIC OS to boot; if not, management controller 212 may erase the SmartNIC OS from SmartNIC 206 and trigger the reinstallation of a new, correct version of the SmartNIC OS.

In addition to its use in binding the host OS and SmartNIC OS together based on the solution ID, the embedded UEFI capsule runtime may also be used to implement various other SmartNIC features, such as vendor-dependent features. For example, it may be used in SmartNIC hardware diagnostics, firmware inventory, application of SmartNIC OS patches, configuration of SmartNIC BIOS attributes, validation of Secure Boot certificates, secure erasure of SmartNIC data, etc.

Figure 3:
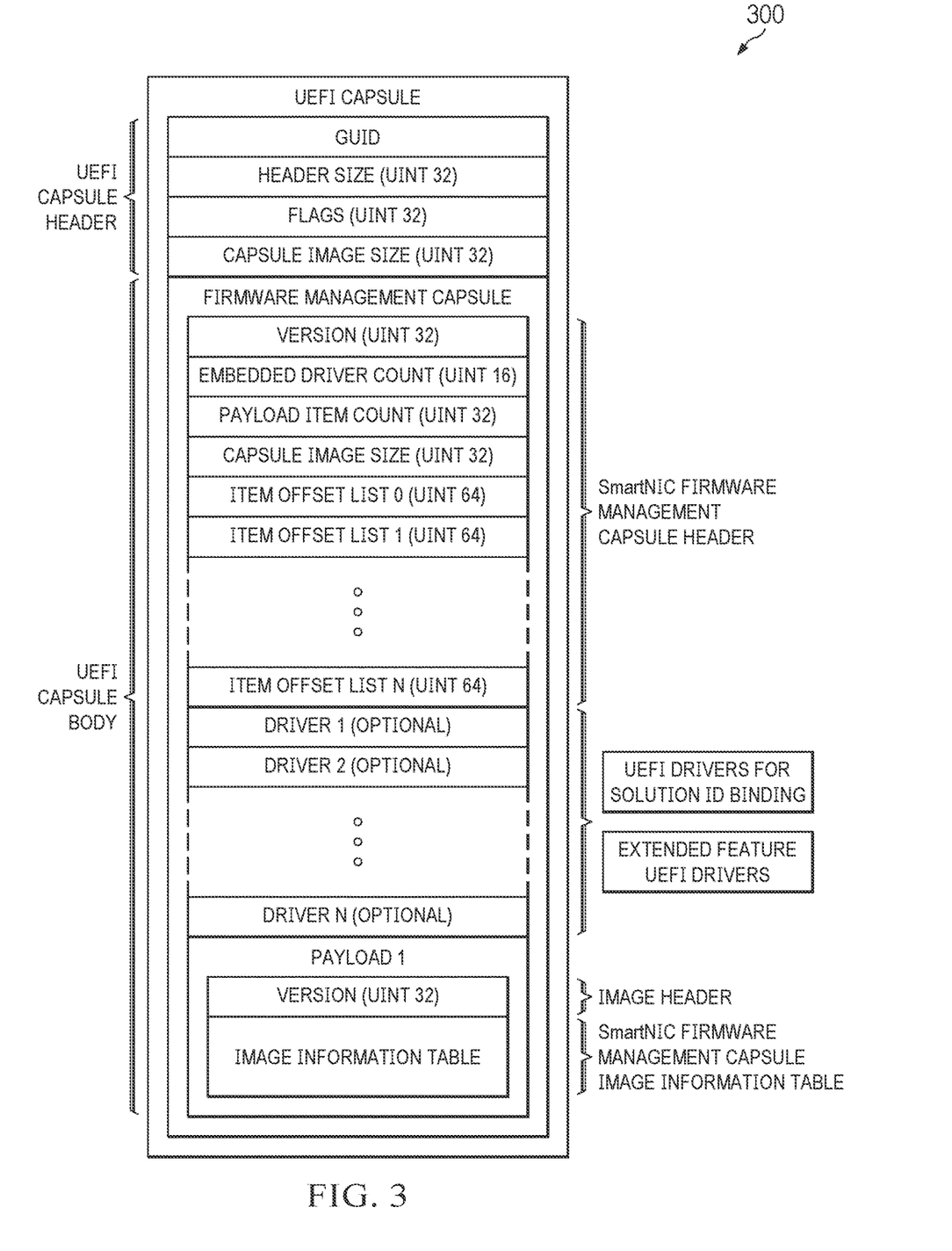
FIG. 3 illustrates an example data structure, in accordance with embodiments of the present disclosure.

FIG. 3 provides an example data structure 300 that may be used to implement the UEFI capsule described above. As shown, information regarding the binding of solution IDs, as well as the extended UEFI features mentioned above, may be included within the driver information of data structure 300.

Figure 4:
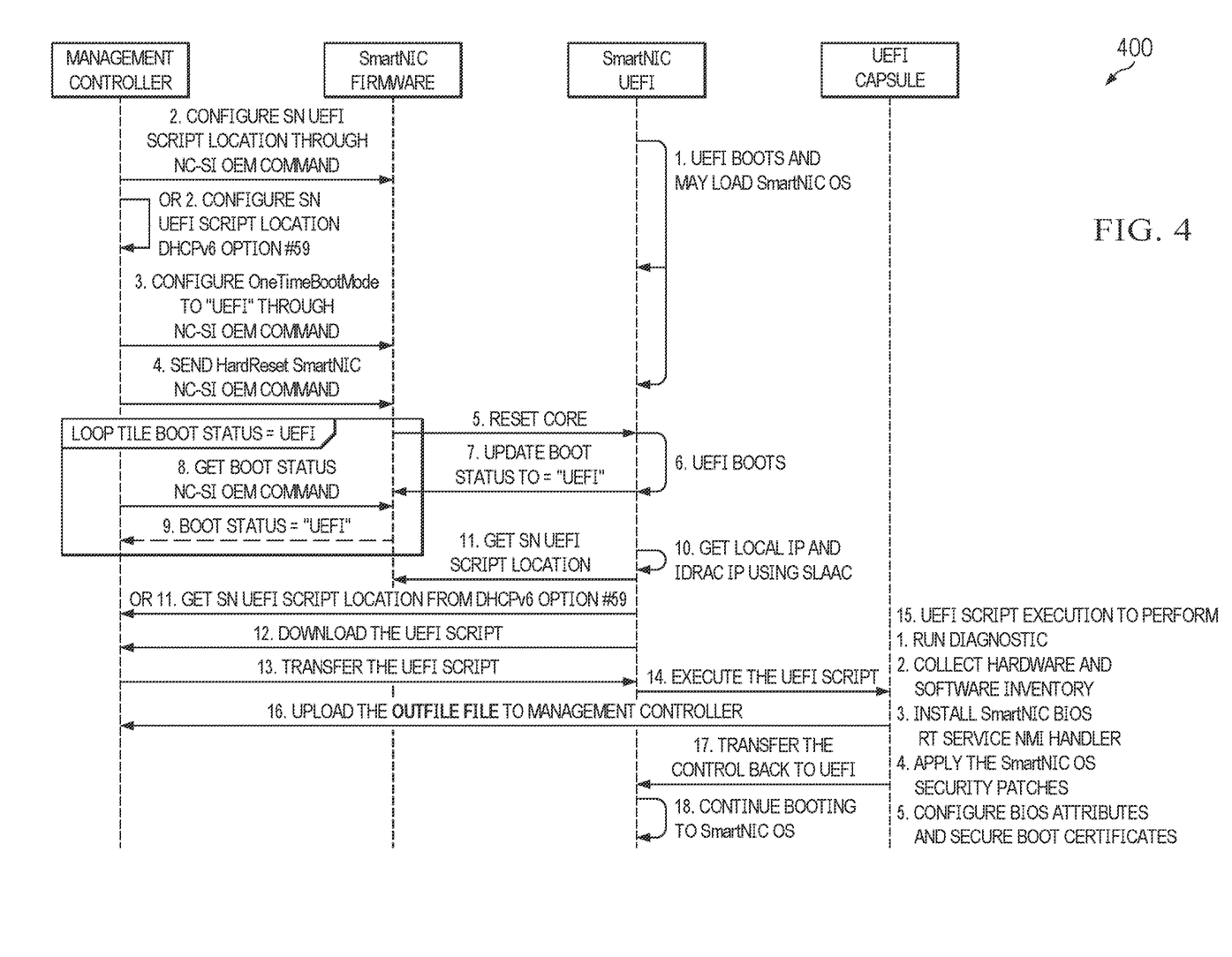
FIG. 4 illustrates an example sequence diagram, in accordance with embodiments of the present disclosure.

Turning now to FIG. 4, a sequence diagram flow chart is shown of an example method 400 for binding a solution ID between a SmartNIC and a host system in order to ensure compatibility, in accordance with some embodiments.

As shown, at step 1, the SmartNIC UEFI may boot and load a SmartNIC OS. The management controller may then push a UEFI script to the SmartNIC UEFI environment by configuring the UEFI environment and then rebooting the SmartNIC.

In particular, at step 2, the management controller may generate a UEFI script and publish it using an HTTP/HTTPS server for retrieval by the SmartNIC UEFI. The management controller may send a uniform resource identifier (URI) for the UEFI script to the SmartNIC firmware or publish the UEFI script URI using DHCPv6 option #59.

At steps 3 and 4, the management controller may configure the SmartNIC to boot one time to the UEFI environment, then issue a hard reset to cause it to reboot. The SmartNIC may then proceed to a UEFI boot as shown, and at step 10 it may determine a local IP address and a management controller IP address using IPv6 Stateless Address Auto Configuration (SLAAC).

At step 11, the SmartNIC UEFI may then retrieve the script location from the SmartNIC firmware or from the DHCPv6 option #59 information, as appropriate. The SmartNIC UEFI may then download, validate, and execute the UEFI script at steps 12-14.

The UEFI script may then gain control and perform the solution ID check as described herein (e.g., by using the results file described below). If the solution ID of the SmartNIC does not match the solution ID stored at the host and/or stored at the management controller, the SmartNIC may not be permitted to continue operating. Instead, the management controller may re-image the SmartNIC with a new, correct SmartNIC OS.

In some embodiments, the UEFI script may also perform various other operations as desired (e.g., diagnostics, hardware and software inventory collection, installing a SmartNIC BIOS real-time service non-maskable interrupt handler, applying SmartNIC OS security patches, configuring BIOS attributes and Secure Boot certificates, etc.).

The UEFI script may in some embodiments generate a results file (e.g., a JSON file) with the result of the various operations and push it to the management controller. The UEFI script may then exit and transfer control back to SmartNIC UEFI. The SmartNIC UEFI may then continue booting to the SmartNIC OS.

One of ordinary skill in the art with the benefit of this disclosure will understand that the preferred initialization point for the method depicted in FIG. 4 and the order of the steps comprising that method may depend on the implementation chosen. In these and other embodiments, this method may be implemented as hardware, firmware, software, applications, functions, libraries, or other instructions. Further, although FIG. 4 discloses a particular number of steps to be taken with respect to the disclosed method, the method may be executed with greater or fewer steps than depicted. The method may be implemented using any of the various components disclosed herein, and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host system;
a management controller configured to provide out-of-band management of the information handling system; and
a network interface controller including a network interface controller storage resource;
wherein the management controller is configured to:
receive, from the host system, a first identifier that is specific to an operating system (OS) of the host system;
compare the first identifier to a second identifier provided by the network interface controller, wherein the second identifier is specific to an OS of the network interface controller that is stored on the network interface controller storage resource; and in response to a mismatch between the first identifier and the second identifier, prevent the network interface controller from operating.

2. The information handling system of claim 1, wherein the network interface controller is a SmartNIC.

3. The information handling system of claim 1, wherein, in response to the mismatch, the management controller is further configured to deploy a new OS to the network interface controller storage resource.

4. The information handling system of claim 1, wherein the management controller is further configured to transmit a script to the network interface controller.

5. The information handling system of claim 4, wherein the script is executable by the network interface controller to provide the second identifier to the management controller.

6. The information handling system of claim 1, wherein, in response to a match between the first identifier and the second identifier, the management controller is configured to allow the network interface controller to continue a boot process.

7. A method comprising, in an information handling system including a host system, a management controller configured to provide out-of-band management of the information handling system, and a network interface controller that includes a network interface controller storage resource:

the management controller receiving, from the host system, a first identifier that is specific to an operating system (OS) of the host system;

the management controller comparing the first identifier to a second identifier provided by the network interface controller, wherein the second identifier is specific to an OS of the network interface controller that is stored on the network interface controller storage resource; and in response to a mismatch between the first identifier and the second identifier, the management controller preventing the network interface controller from operating.

8. The method of claim 7, wherein the network interface controller is a SmartNIC.

9. The method of claim 7, further comprising:

in response to the mismatch, the management controller deploying a new OS to the network interface controller storage resource.

10. The method of claim 7, further comprising:

transmitting a script to the network interface controller.

11. The method of claim 10, wherein the script is executable by the network interface controller to provide the second identifier to the management controller.

12. The method of claim 7, wherein, in response to a match between the first identifier and the second identifier, the management controller is configured to allow the network interface controller to continue a boot process.

13. An article of manufacture comprising a non-transitory, computer-readable medium having instructions thereon that are executable by at least one processor of a management controller of an information handling system for:

receiving, from a host system of the information handling system, a first identifier that is specific to an operating system (OS) of the host system;

comparing the first identifier to a second identifier provided by a network interface controller, wherein the second identifier is specific to an OS of the network interface controller that is stored on a network interface controller storage resource; and in response to a mismatch between the first identifier and the second identifier, preventing the network interface controller from operating.

14. The article of claim 13, wherein the network interface controller is a SmartNIC.

15. The article of claim 13, wherein the instructions are further executable for:

in response to the mismatch, deploying a new OS to the network interface controller storage resource.

16. The article of claim 13, wherein the instructions are further executable for:

transmitting a script to the network interface controller.

17. The article of claim 16, wherein the script is executable by the network interface controller to provide the second identifier to the management controller.

18. The article of claim 13, wherein, in response to a match between the first identifier and the second identifier, the management controller is configured to allow the network interface controller to continue a boot process.

* * * * *